Feb. 13, 1962   D. E. BERGER ET AL   3,021,263
FRACTIONATION COLUMN CONTROL
Filed Sept. 24, 1956   3 Sheets-Sheet 1

INVENTORS
D. E. BERGER
E. C. MILLER
BY Hudson & Young
ATTORNEYS

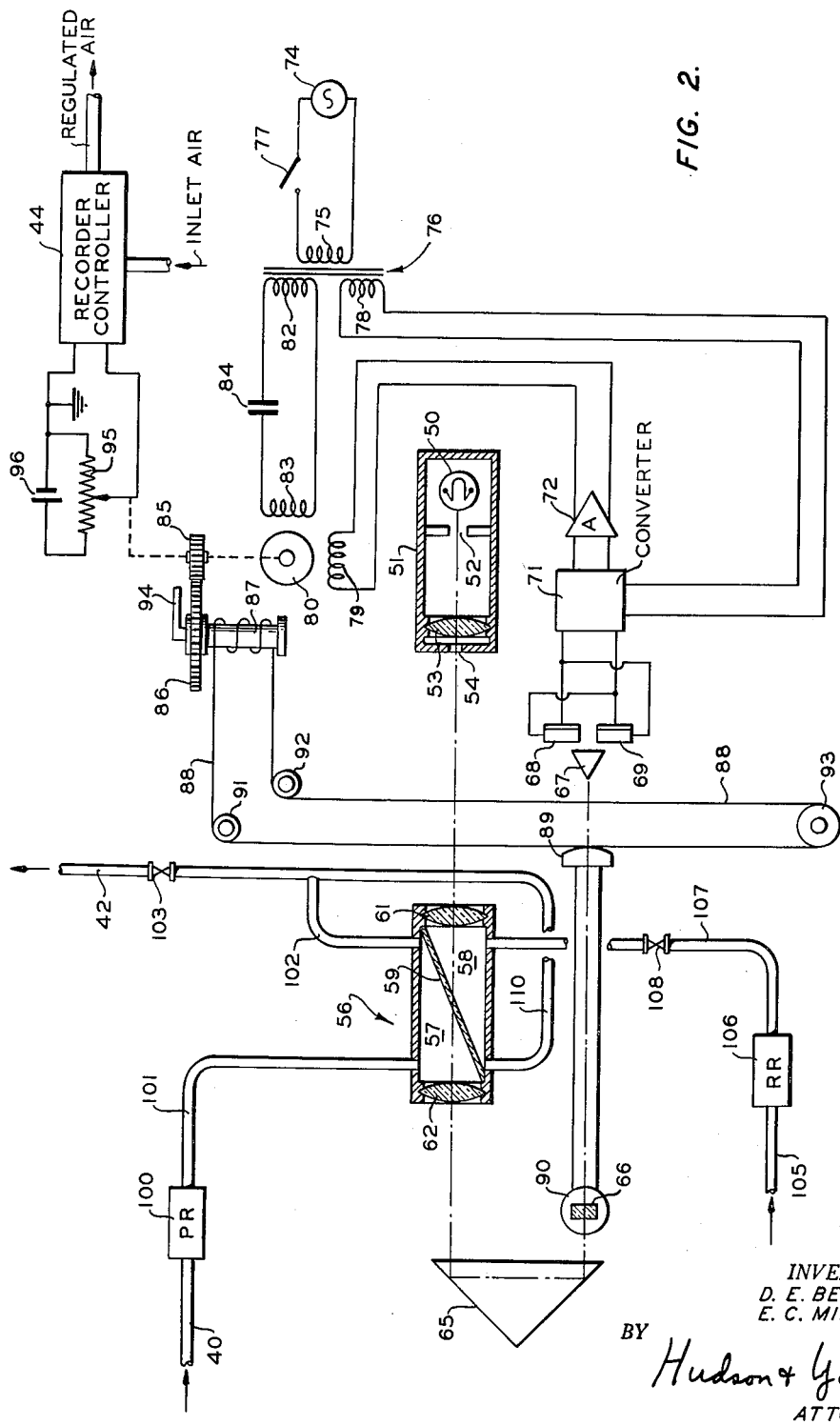

Feb. 13, 1962 D. E. BERGER ET AL 3,021,263
FRACTIONATION COLUMN CONTROL
Filed Sept. 24, 1956 3 Sheets-Sheet 3

INVENTORS
D. E. BERGER
E. C. MILLER
BY Hudson & Young
ATTORNEYS

United States Patent Office 3,021,263
Patented Feb. 13, 1962

3,021,263
FRACTIONATION COLUMN CONTROL
Donald E. Berger and Elmer C. Miller, Bartlesville, Okla., assignors to Phillips Petroleum Company, a corporation of Delaware
Filed Sept. 24, 1956, Ser. No. 611,704
5 Claims. (Cl. 202—40)

This invention relates to a method of controlling the separation of a fluid mixture in a fractionation column in response to a measurement of the refractive index of the vapor of a fluid sample removed from the process.

It is common practice in the petroleum and chemical industries to separate fluid mixtures by means of fractionation columns. These columns are provided with a plurality of liquid-vapor contacting surfaces, such as bubble trays or packing material. Heat is supplied to the lower region of the column to vaporize the feed mixture which is introduced into the column. A kettle product stream which is rich in the higher boiling constituents of the mixture is removed from the lower region of the column. A vapor stream is removed from the upper region of the column. This vapor stream is partially or completely condensed and a portion of the condensed material normally is returned to the column as reflux. Various systems have been devised to control the operation of such fractionation columns in order to maintain desired degrees of separation of fluid mixtures. These control systems have generally been based upon measurements of flow rates, temperatures, and pressures. In recent years, a number of control systems have been devised which are based upon the continuous removal of a sample stream from the column and a subsequent analysis of the stream to determine the concentration of a particular constituent or constituents. The present invention relates to an improved control system of this general type.

In petroleum refining operations, it is often desirable to separate a first group of hydrocarbons, such as normal and isobutane, from the $C_5$ and heavier constituents of a fluid mixture, for example. In such a separation, the heavy key component in the column can be either isopentane or isopentane plus neopentane. Because of this complexity, an automatic composition control system based on a measurement of the concentration of the combination heavy key component in the upper region of the column should not distinguish isopentane from neopentane. An analysis by conventional instruments, such as an infrared analyzer or a mass spectrometer, does distinguish one of these components from the other. In accordance with the present invention, a gas phase refractometer is employed to analyze such a fluid stream. The refractive indices of hydrocarbons in the vapor phase are primarily functions of the molecular weights of the hydrocarbons. The above-described system is thus in effect reduced to a binary mixture of hydrocarbons having 4 and 5 carbon atoms per molecule. A measurement of the refractive index of a sample stream in the vapor phase thus provides a measurement of the relative concentrations of the two groups of hydrocarbons at the sample point in the column. Variation in the relative concentrations of normal and isobutane do not affect the analysis. Several embodiments of fractionation column control systems based upon such a measurement are provided in accordance with this invention.

Accordingly, it is an object of this invention to provide an improved method for analyzing and for controlling the separation of fluid mixtures.

A further object is to provide a method of controlling the operations of fractionation columns in response to an analysis of a sample stream removed from the column in terms of a measurement of the refractive index of the sample in the vapor phase.

A further object is to provide a method of controlling the separation of hydrocarbons having 4 and 5 carbon atoms per molecule.

Other objects, advantages, and features of this invention should become apparent from the following detailed description which is taken in conjunction with the accompanying drawings in which:

FIGURE 2 is a schematic representation of a differential refractometer which can be employed as the analyzer in the control system of FIGURE 1.

Figure 1:
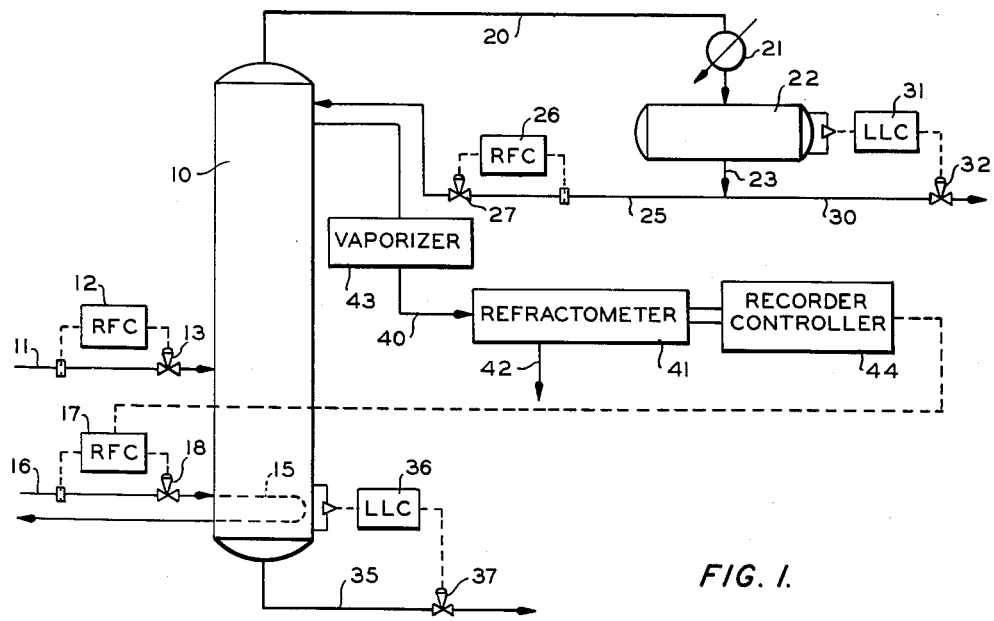
FIGURE 1 is a schematic representation of a first embodiment of the control system of this invention.

Referring now to the drawing in detail and to FIGURE 1 in particular, there is shown a fractionation column 10. A feed mixture to be separated is introduced into column 10 through a conduit 11 at a predetermined flow rate which is maintained by a rate-of-flow controller 12 that adjusts a valve 13. Heat is supplied to the lower region of column 10 by means of a heating element, which can be a coil 15 disposed in the column or an external reboiler. Steam or other heating material is circulated through coil 15 by means of a conduit 16. This heating material is supplied at a predetermined rate which normally is maintained by a rate-of-flow controller 17 that adjusts a valve 18. A kettle product is withdrawn from column 10 through a conduit 35 at a rate which is proportional to the liquid level in column 10. A liquid level controller 36 adjusts a valve 37 in conduit 35.

Vapors are removed from the top of column 10 through a conduit 20 which communicates with a reflux accumulator 22 through a condenser 21. Condensed liquid is removed from accumulator 22 through a conduit 23. Part of the flow through conduit 23 is returned to column 10 as reflux through a conduit 25. The flow through conduit 25 is maintained at a predetermined rate by a rate-of-flow controller 26 which adjusts a valve 27. The remainder of the liquid withdrawn from accumulator 22 through conduit 23 is removed from the system through an overhead product conduit 30 at a rate which is a function of the liquid level in accumulator 22. A liquid-level controller 31 regulates a valve 32 in conduit 30 in such a manner as to tend to maintain a predetermined liquid level in accumulator 22.

A sample stream is withdrawn from an upper region of column 10 through a conduit 40 which communicates through a vaporizer 43 with the inlet of a refractometer 41. This sample stream is subsequently vented from refractometer 41 through a conduit 42. Refractometer 41 provides an output signal which is a function of the refractive index of the gas phase of the sample removed from column 10. This signal is applied to a recorder-controller 44 which can be a conventional control instrument. Controller 44 provides an output signal, which can be pneumatic, for example, that is applied to flow controller 17. The output signal from controller 44 thus resets flow controller 17 in the manner described hereinafter in greater detail.

An instrument which can advantageously be employed as refractometer 41 in the control system of FIGURE 1 is illustrated in FIGURE 2. This instrument comprises a source of light 50 which is mounted in a housing 51. Source 50 can be an ordinary incandescent bulb which emits radiation in the visible spectrum. A portion of the light emitted from source 50 passes through a first aperture 52 and a converging lens 53. A narrow beam of this light emerges from housing 51 through a second aperture 54. This light beam is directed through a refractometer cell assembly 56. The purpose of aperture 52 is to reduce the total radiation transmitted from light source 50 in order to minimize heating of the cell assembly. The filament of source 50 is located slightly beyond the focal point of lens 53, which in turn is positioned in close proximity to aperture 54. Aperture 54 is at the focal point of lens 61.

Cell assembly 56 comprises first and second chambers 57 and 58 which are separated by a plate 59 of radiation transparent material. Plate 59 is disposed at an angle other than 90° with respect to the axis of the beam of radiation transmitted through the cell assembly.

The light beam emerging from lens 62 enters a glass prism 65 which is positioned such that its front surface is substantially perpendicular to the light beam. The light is twice reflected within prism 65 and emerges in a direction so as to pass through a rotatable glass block 66. The light beam then strikes the apex of a second prism 67. A radiation detecting unit, which comprises photovoltaic cells 68 and 69, is positioned so that a light beam striking the apex of prism 67 is divided into two beams of equal magnitude which impinge upon the two cells. The output voltages of cells 68 and 69 are connected in opposition to one another to the input terminals of a converter 71. The differential output signal from the two cells is thus converted into a corresponding alternating signal which is applied to the input terminals of an amplifier 72. Converter 71 is energized from a source of alternating current 74 which is applied through a switch 77 across the primary winding 75 of a transformer 76. The first secondary winding 78 of transformer 76 is connected to converter 71 so that the frequency of the signal applied to amplifier 72 is the same as that of current source 74. The output signal of amplifier 72 is applied to a first winding 79 of a reversible two phase induction motor 80. A second secondary winding 82 of transformer 76 is connected across the second motor winding 83 through a capacitor 84. This results in the two signals applied to the motor windings being either 90° or 270° out of phase with one another, depending upon the polarity of the input signal applied to converter 71.

The drive shaft of motor 80 is connected through gears 85 and 86 to a drum 87. A wire 88 is attached to a rocker arm 89 which is connected to the base 90 upon which block 66 rotates. Wire 88 extends from rocker arm 89 about guide wheels 91, 92 and 93 and drum 87. Rotation of drum 87 thus results in block 66 being rotated about its pivot point. The drive shaft of motor 80 is also connected to the contactor of a telemetering potentiometer 95. A voltage source 96 is connected across the end terminals of potentiometer 95. The contactor and one end terminal of potentiometer 95 are connected to the respective input terminals of recorder-controller 44. Controller 44 can be a conventional instrument which provides a regulated output air pressure which is a function of an electrical input signal. This output air pressure can be employed to reset rate-of-flow controller 17 of FIGURE 1.

The sample stream removed from column 10 of FIGURE 1 is vaporized and directed by means of conduit 40 to the inlet of a pressure regulator 100. The outlet of pressure regulator 100 is connected by a conduit 101 to the inlet of chamber 57. The outlet of chamber 57 is connected by conduit 102 to the inlet of a valve 103. The outlet of valve 103 is connected to vent conduit 42. A reference gas, normal butane, for example, is supplied by a conduit 105 which communicates with the inlet of a second pressure regulator 106. The outlet of pressure regulator 106 is connected by a conduit 107, which has a valve 108 therein, to the inlet of chamber 58. The outlet of chamber 58 is connected by conduit 110 to the inlet of valve 103. The refractive index measurement is made by comparing the refractive index of the sample gas with the refractive index of a reference gas. It is generally desired that the gas sample be maintained at a pressure greater than atmospheric in order to provide a greater sensitivity. Pressures in the order of 15 to 30 pounds per square inch absolute can be employed to advantage, although higher pressures can be used if desired. The reference gas is supplied by conduit 105 at a slightly higher pressure. Pressure regulator 100 thus maintains the sample which is circulated through chamber 57 at the desired pressure. Pressure regulator 106 is set at a pressure above that maintained by regulator 100. Exhausting into a chamber held at constant pressure, regulator 106 and valve 108 function as a flow regulator. If valve 103 is adjusted so that flow through it is greater than the flow through valve 108 and chamber 58, there will be flow of sample through chamber 57. Flow control system 100 and 103 must then be set at a flow rate greater than system 106 and 108. However, the reference gas in chamber 58 can remain stationary, if desired.

If the refractive index of the gas in chamber 57 is the same as the refractive index of the gas in chamber 58, the light beam emerging from cell assembly 56 is parallel to the light beam which enters the cell assembly. Any change in refractive index of the sample fluid results in a deviation of the direction of the emerging light beam. The servo system operates so that the light beam impinges upon the apex of prism 67. This results in equal output voltages being provided by cells 68 and 69 so that the differential output voltage is zero. Motor 80 thus remains stationary. If the light beam should deviate in either direction, one of the photovoltaic cells receives a greater amount of radiation than the other. This results in an output signal which drives motor 80 to rotate drum 87. The direction of rotation is such as to rotate block 66 in a direction to move the light beam back to the apex of prism 67. The amount of motor rotation is thus representative of changes in the refractive index of the sample fluid. This rotation is applied, by means of potentiometer 95, as a corresponding electrical input signal to recorder-controller 44. The output air pressure of recorder-controller 44 is representative of the input electrical signal applied thereto.

As a specific example of the operation of this invention, reference is made to a particular fluid separation. A hydrocarbon feed stream having the following composition, based on carbon atoms per molecule, is directed to column 10 through conduit 11 at the rate indicated.

| Constituents: | Rate (thousands of gallons per day) |
| --- | --- |
| $C_1$ | 1.7 |
| $C_2$ | 13.8 |
| $C_3$ | 598.1 |
| Iso-$C_4$ | 274.8 |
| Normal $C_4$ | 1011.7 |
| Iso-$C_5$ | 388.5 |
| Normal $C_5$ | 424.7 |
| Iso-$C_6$ | 169.1 |
| Normal $C_6$ | 146.8 |
| Iso-$C_7$ | 106.0 |
| Normal $C_7$ and heavier | 130.3 |

These measurements of the lighter constituents are based on liquid volumes of condensed gases. Column 10 normally is operated so that temperature at the bottom of the column is approximately 275° F. and the temperature at the top of the column is 168° F. The pressure in the lower region of column 10 is approximately 133 pounds per square inch gage. Condenser 22 is operated at a temperature of approximately 157° F. and at a pressure of approximately 110 pounds per square inch gage. The reflux ratio is approximately 1 to 1 based upon the feed to the column and approximately 4 to 1 based on the overhead withdrawn through conduit 20. This results in a separation such that the overhead and kettle streams from the separation unit have compositions approximately as follows:

Overhead

| Component: | Rate |
|---|---|
| $C_1$ | 1.7 |
| $C_2$ | 13.8 |
| $C_3$ | 598.1 |
| Iso-$C_4$ | 274.8 |
| Normal $C_4$ | 981.4 |
| Iso-$C_5$ | 8.2 |

Kettle

| Component: | Rate |
|---|---|
| Normal $C_4$ | 30.3 |
| Iso-$C_5$ | 380.3 |
| Normal $C_5$ | 424.7 |
| Iso-$C_6$ | 169.1 |
| Normal $C_6$ | 146.8 |
| Iso-$C_7$ | 106.0 |
| Normal $C_7$ and heavier | 130.3 |

From the foregoing it should be evident that the column operates as a debutanizer. The principal separation is between constituents having 4 or less carbon atoms per molecule and constituents having 5 or more carbon atoms per molecule. The $C_4$ constituents comprise normal and isobutane whereas the $C_5$ constituents comprise normal petane, isopentane and neopentane. The refractive indices of these constituents and of propane in the gaseous state are approximately as follows:

| | |
|---|---|
| Propane | 1.0011 |
| Isobutane | 1.0014 |
| Normal butane | 1.0014 |
| Neopentane | 1.0018 |
| Normal pentane | 1.0018 |
| Isopentane | 1.0018 |

The control system of this invention operates in such a manner as to tend to maintain the composition of the fluid at the sample point in column 10 constant at a predetermined value. This insures that the desired separation is being made. In accordance with the control system of FIGURE 1, the heat balance of the column is regulated directly in response to a measurement of the refractive index of a sample stream removed from an upper region of column 10. This is the presently preferred control system in most applications because the heat balance is adjusted directly from measured deviations in composition.

The index of refraction of a hydrocarbon gas is a function of the molecular weight of the gas rather than of the isomeric structure. As indicated above, the isomers have substantially the same refractive indices. In the particular application described, the concentration of propane is relatively small and remains substantially constant in the upper region of column 10. Therefore, by locating the sample point at or near the top of column 10, differences in propane concentration contribute no significant interference to the analysis and the sample stream can be regarded as primarily a binary mixture of hydrocarbons having 4 and 5 carbon atoms per molecule. It is preferred that a liquid sample be removed from a tray of column 10 in order to obtain a material which is truly representative of the concentrations of the various constituents in the column at that point. This sample is then vaporized and directed to refractometer 41. The refractive index measurement is made by comparing the refractive index of the sample with that of a reference fluid in chamber 58. Normal or isobutane can be employed advantageously as the reference fluid. Column 10 normally is operated in a manner so as to maintain a desired separation between the $C_4$ and $C_5$ constituents in the mixture. If the measured refractive index should change in a manner (decrease) such as to indicate that the concentration of the $C_5$ constituents in the sample stream has decreased, controller 44 operates so as to reset flow controller 17 to increase the amount of steam supplied to coil 15. This increases the heat supply to the column so that a greater amount of the feed mixture is removed as overhead product. Conversely, if the measured refractive index should deviate in the opposite direction, the supply of steam to coil 15 is decreased. The remaining controls on the column operates in a conventional manner to retain a balanced operation.

Figure 3:
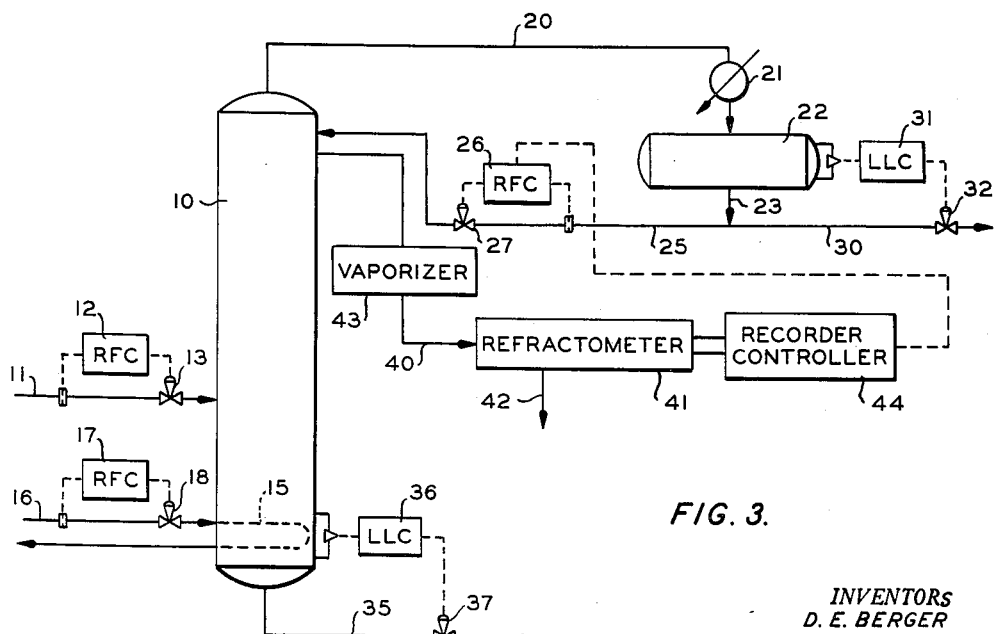
FIGURE 3 is a schematic representation of a second embodiment of the control system of this invention.

In FIGURE 3 there is shown a second embodiment of the control system of this invention. The fractionation column and the associated controls are generally similar to those shown in FIGURE 1 for the most part and corresponding elements are designated by like reference numerals. The control system of FIGURE 3 differs from that of FIGURE 1 in that the output of recorder-controller 44 is employed to reset rate-of-flow controller 26 instead of rate-of-flow controller 17. This results in a direct regulation of the reflux rate in the system. This system is sometimes desirable if the sample point of conduit 40 is at or extremely near the top of column 10. If the measured refractive index should deviate in such a manner (increase) as to indicate a greater concentration of the $C_5$ constituents at the top of column 10, controller 44 resets controller 26 so as to increase the reflux rate. Conversely, if the measured refractive index varies in the opposite manner, controller 26 is reset to decrease the reflux rate. The separation in the column can accurately be controlled by the reflux ratio.

Figure 4:
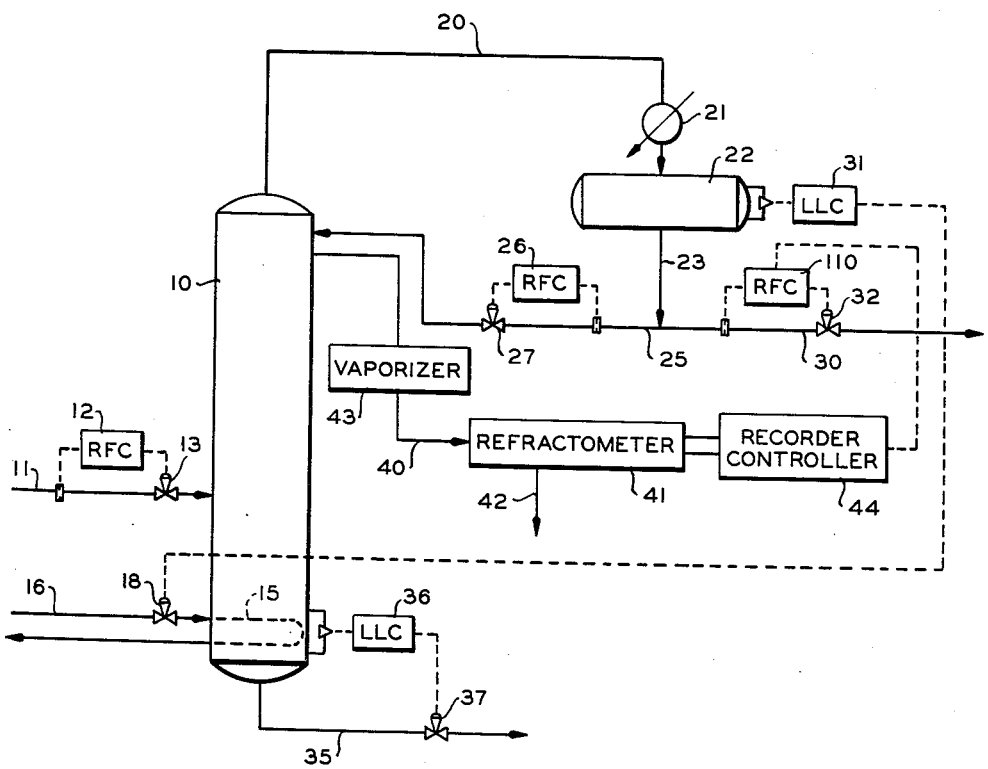
FIGURE 4 is a schematic representation of a third embodiment of the control system of this invention.

In FIGURE 4 there is shown a third embodiment of the control system of this invention. This system is generally similar to the systems of FIGURES 1 and 3 except that the output signal of controller 44 resets a rate-of-flow controller 110 which adjusts a valve 32 to regulate the flow through the overhead product conduit 30. Liquid level controller 31 adjusts the heat input into the column by regulating valve 18 in steam line 16. In the system of FIGURE 4, the heat supplied to the column is regulated so as to tend to maintain a constant liquid level in accumulator 22. If the measured refractive index should deviate in such a manner (increase) as to indicate an increase in the $C_5$ concentration near the top of column 10, controller 110 is reset so that valve 32 is closed to a greater extent. The liquid level in accumulator moves upwardly, and this in turn tends to close valve 18 to apply less heat to the column. Conversely, if the measured refractive index indicates a decrease in $C_5$ concentration, the control steps are reversed.

The three illustrated embodiments are illustrative of the control steps of this invention, and apparatus for practicing and applying the same. While the invention has been described in conjunction with present preferred embodiments, it should be evident that it is not limited thereto.

What is claimed is:

1. A method of separating a hydrocarbon mixture which comprises passing the hydrocarbon mixture to be separated to a fractionation zone, withdrawing a liquid sample stream consisting essentially of two vaporizable isomeric compounds and isomers of each compound, each said compound and its isomers having the same molecular weight, the refractive indices of each isomeric compound and its own isomers being equal to the fourth decimal place when in the vaporized state and different from the refractive indices of the other said compound and its isomers in the mixture from said zone, vaporizing all of said sample stream, measuring the refractive index of the gas produced by said vaporizing step, and adjusting the heat balance in said zone in response to the measurement so as to tend to maintain the measured refractive index of said sample stream constant.

2. A method of separating a hydrocarbon consisting essentially of normal butane, isobutane, normal pentane, isopentane and neopentane into a first stream consisting essentially of normal butane and isobutane and a second stream consisting essentially of normal pentane, isopentane and neopentane which comprises directing a stream of such a hydrocarbon mixture to be separated to a fractionation zone, removing such a first stream from said zone, removing such a second stream from said zone, withdrawing a liquid sample stream from said zone, vaporizing all of said sample stream, measuring the refractive index of the gas produced by said vaporizing step, and adjusting the heat balance in said zone in response to the measurement so as to tend to maintain the measured refractive index constant.

3. The method according to claim 2 wherein said liquid sample stream comprises essentially such first stream.

4. A process of determining a relative concentration of total isomers of butane and pentane, respectively, in a fluid sample comprising essentially isomers of both butane and pentane, such process comprising the steps of vaporizing all of a sample of such fluid mixture to thereby produce a gas, and measuring the refractive index of said gas.

5. In a method of separating a hydrocarbon mixture consisting essentially of normal butane, isobutane, normal pentane, isopentane and neopentane into a first stream comprising normal pentane and isobutane and a second stream comprising normal pentane, isopentane, and neopentane which comprises directing a stream of such a mixture to be separated to a fractionation zone, removing such a first stream from said zone, removing such a second stream from said zone and automatically controlling the heat balance surrounding the fractionation zone to tend to maintain a refractive index constant of one of such streams, the improvement comprising withdrawing a liquid sample stream comprising essentially such first stream, vaporizing all of said liquid sample stream to produce a gaseous sample, measuring the refractive index of said gaseous sample, and adjusting such heat balance in response to said step of measuring.

References Cited in the file of this patent

UNITED STATES PATENTS

| | | |
|---|---|---|
| 1,471,342 | Logan | Oct. 23, 1923 |
| 2,529,030 | Latchum | Nov. 7, 1950 |
| 2,709,678 | Berger | May 31, 1955 |
| 2,774,715 | Gilmore | Dec. 18, 1956 |
| 2,816,858 | Walker | Dec. 17, 1957 |